US011333241B2

(12) United States Patent
Kawaguchi et al.

(10) Patent No.: US 11,333,241 B2
(45) Date of Patent: May 17, 2022

(54) SHIFT RANGE CONTROL DEVICE

(71) Applicant: DENSO CORPORATION, Kariya (JP)

(72) Inventors: Yusaku Kawaguchi, Kariya (JP); Jun Yamada, Kariya (JP); Seiji Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/318,508

(22) Filed: May 12, 2021

(65) Prior Publication Data
US 2021/0262566 A1 Aug. 26, 2021

Related U.S. Application Data

(63) Continuation of application No. PCT/JP2019/041081, filed on Oct. 18, 2019.

(30) Foreign Application Priority Data

Nov. 15, 2018 (JP) .............................. JP2018-214394

(51) Int. Cl.
| F16H 61/12 | (2010.01) |
| F16H 61/32 | (2006.01) |
| F16H 63/30 | (2006.01) |
| F16H 63/38 | (2006.01) |
| F16H 61/00 | (2006.01) |

(52) U.S. Cl.
CPC .............. *F16H 61/12* (2013.01); *F16H 61/32* (2013.01); *F16H 63/304* (2013.01); *F16H 63/38* (2013.01); *F16H 2061/0087* (2013.01); *F16H 2061/1284* (2013.01); *F16H 2061/326* (2013.01)

(58) Field of Classification Search
CPC .. F16H 61/12; F16H 61/32; F16H 2061/0087; F16H 2061/1284; F16H 2061/326; F16H 2061/1208; F16H 2061/1212; F16H 2061/1258; F16H 63/304; F16H 63/38
See application file for complete search history.

(56) References Cited

U.S. PATENT DOCUMENTS

| 2004/0008002 A1 | 1/2004 | Kamio et al. |
| 2004/0200301 A1 | 10/2004 | Amamiya et al. |
| 2006/0108966 A1 | 5/2006 | Kamio et al. |

(Continued)

FOREIGN PATENT DOCUMENTS

| JP | 4082164 | 4/2008 |
| JP | 2014-1806 | 1/2014 |

*Primary Examiner* — Edwin A Young
(74) *Attorney, Agent, or Firm* — Nixon & Vanderhye P.C.

(57) ABSTRACT

A shift range control device includes an encoder count unit, an energization control unit, a learning unit, an energization phase count unit, and an abnormality determination unit. The encoder count unit calculates an encoder count value based on an encoder signal. The energization control unit controls energization to the motor. The learning unit learns a wall position that is the encoder count value when an engaging member abuts on the wall portion. The energization phase count unit calculates an energization phase count value that is counted according to switching of the energization phase. The abnormality determination unit determines an abnormality of the encoder based on the energization phase count value and the encoder count value before and after learning the wall position.

12 Claims, 11 Drawing Sheets

(56) References Cited

U.S. PATENT DOCUMENTS

2008/0001568 A1* 1/2008 Hori .................. F16H 61/32
 318/652
2013/0141031 A1 6/2013 Yamada

* cited by examiner

SHIFT RANGE CONTROL DEVICE

CROSS REFERENCE TO RELATED APPLICATIONS

The present application is a continuation application of International Patent Application No. PCT/JP2019/041081 filed on Oct. 18, 2019, which designated the U.S. and claims the benefit of priority from Japanese Patent Application No. 2018-214394 filed on Nov. 15, 2018. The entire disclosures of all of the above applications are incorporated herein by reference.

TECHNICAL FIELD

The present disclosure relates to a shift range control device.

BACKGROUND

Conventionally, a motor control device applied to a range switching apparatus of a vehicle has been known.

SUMMARY

The present disclosure provides a shift range control device that determines an abnormality of an encoder based on an energization phase count value and an encoder count value before and after learning a wall position.

BRIEF DESCRIPTION OF DRAWINGS

Objects, features and advantages of the present disclosure will become apparent from the following detailed description made with reference to the accompanying drawings. In the drawings.

DETAILED DESCRIPTION

A shift range control device may perform an initial drive for switching an energization phase by open loop control after a power source is turned on. Every time the energization phase is switched during the initial drive, the shift range control device may detect a moment when a combination of signal values of an A phase and a B phase of an encoder becomes a combination corresponding to the energization phase at that time, and may calculate a learning value of a reference position based on an encoder count value at that time. Further, after the initial drive, the shift range control device may correct the encoder count value by the learning value of the reference position, and may determine the energization phase based on the corrected encoder count value.

In the shift range control device described above, there may be a case where an abnormality such as a missing of an encoder signal occurs after the initial drive. If an abnormality occurs in the encoder signal, there is a risk of erroneous learning of the reference position.

A shift range control device according to an aspect of the present disclosure switches a shift range by controlling drive of a motor in a shift range switching system that includes the motor, an encoder, and a shift range switching mechanism. The encoder is configured to output an encoder signal that is a detection signal according to a rotation position of the motor. The shift range switching mechanism includes a rotating member and an engaging member. The rotating member is formed with a plurality of valley portions and a plurality of wall portions provided at both ends of the plurality of valley portions, and rotates integrally with an output shaft to which the rotation of the motor is transmitted. The engaging member is capable of engaging with one of the valley portions corresponding to the shift range.

The shift range control device includes an encoder count unit, an energization control unit, a learning unit, an energization phase count unit, and an abnormality determination unit. The encoder count unit is configured to calculate an encoder count value based on the encoder signal. The energization control unit is configured to control energization to the motor. The learning unit is configured to learn a wall position that is the encoder count value when the engaging member abuts on one of the wall portions. The energization phase count unit is configured to calculate an energization phase count value that is counted according to switching of the energization phase. The abnormality determination unit is configured to determine an abnormality of the encoder based on the energization phase count value and the encoder count value before and after learning the wall position. As a result, the abnormality of the encoder can be detected appropriately.

Embodiment

Figure 1:
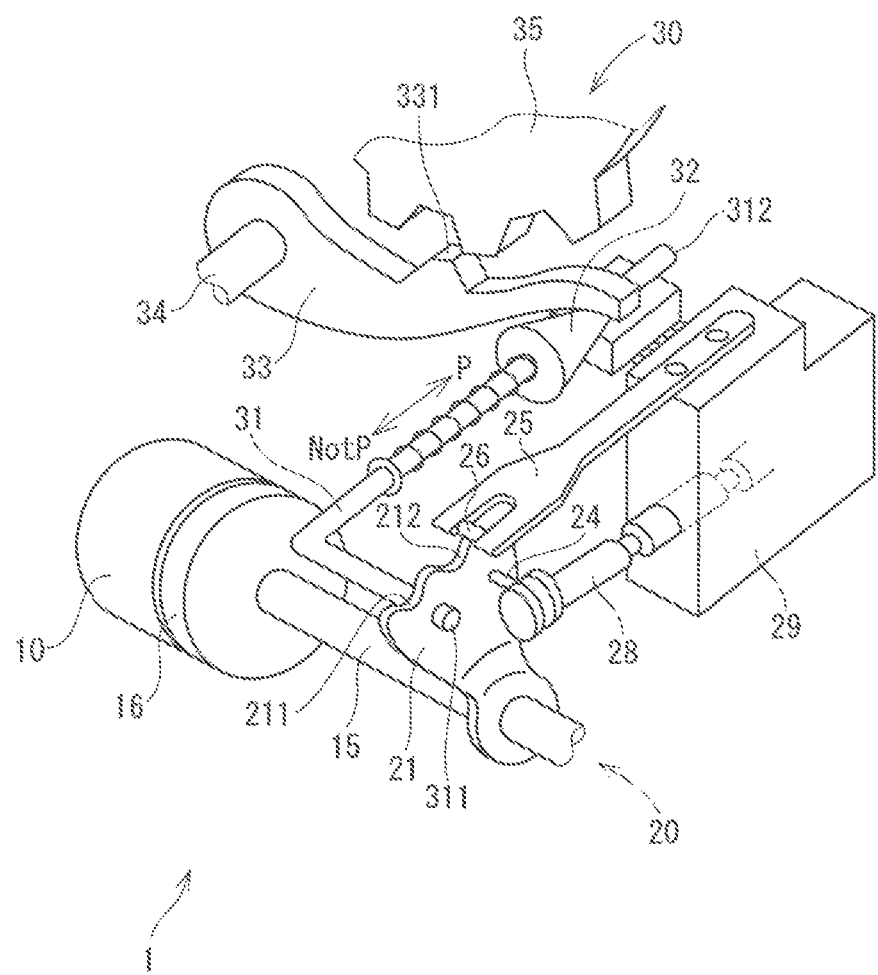
FIG. 1 is a perspective view showing a shift-by-wire system according to one embodiment.
Figure 2:
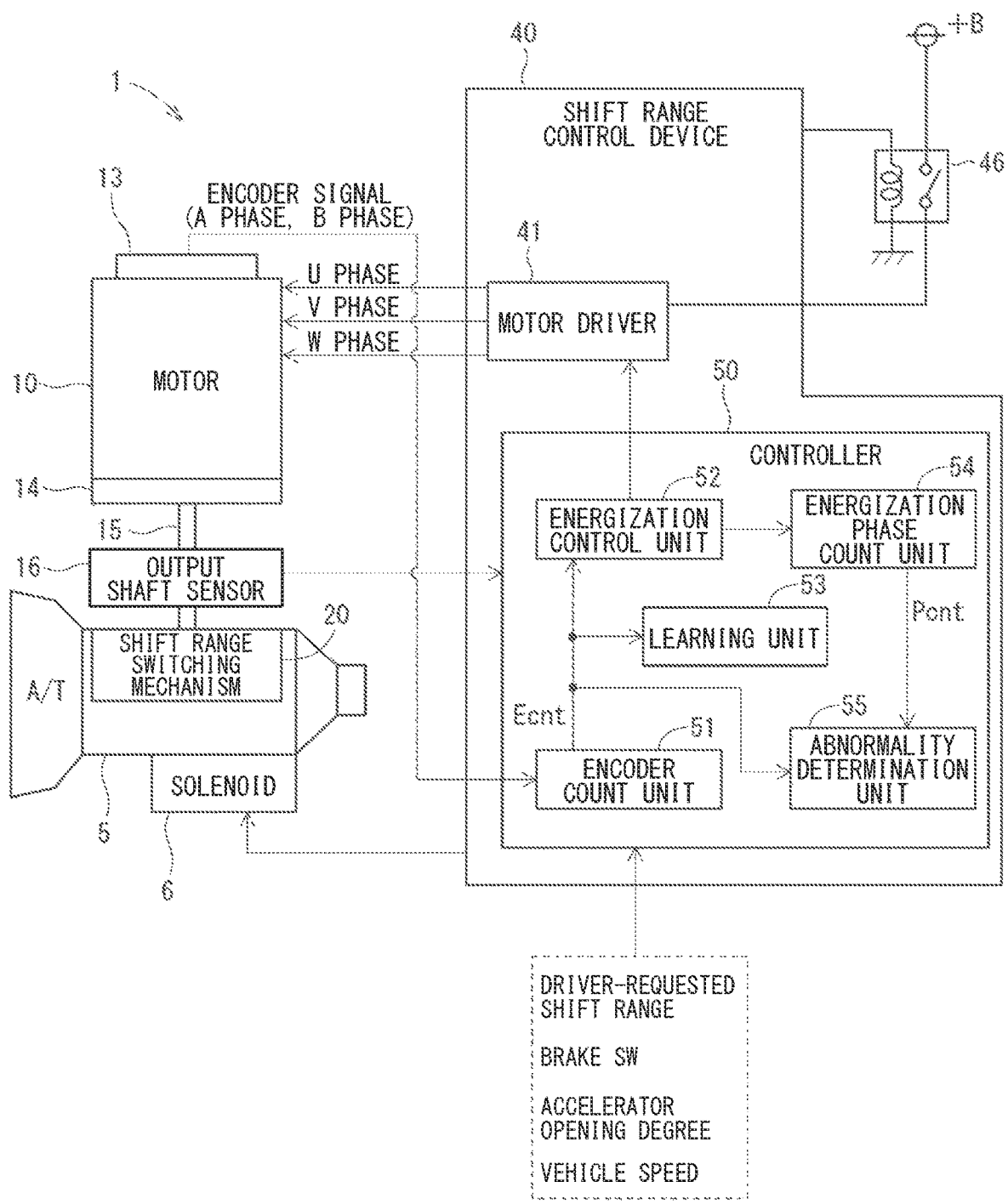
FIG. 2 is a block diagram showing a general configuration of the shift-by-wire system according to the one embodiment.

Hereinafter, a shift range control device according to the present disclosure will be described with reference to the drawings. The shift range control device according to one embodiment of the present disclosure is shown in FIGS. 1 to 13. As shown in FIGS. 1 and 2, a shift-by-wire system 1 being a shift range switching system includes a motor 10, a shift range switching mechanism 20, a parking lock mechanism 30, a shift range control device 40, and the like. The motor 10 rotates while receiving an electric power from a battery 45 mounted on a vehicle (not shown), and functions as a driving source of the shift range switching mechanism 20. The motor 10 is, for example, a switched reluctance motor.

Figure 3:
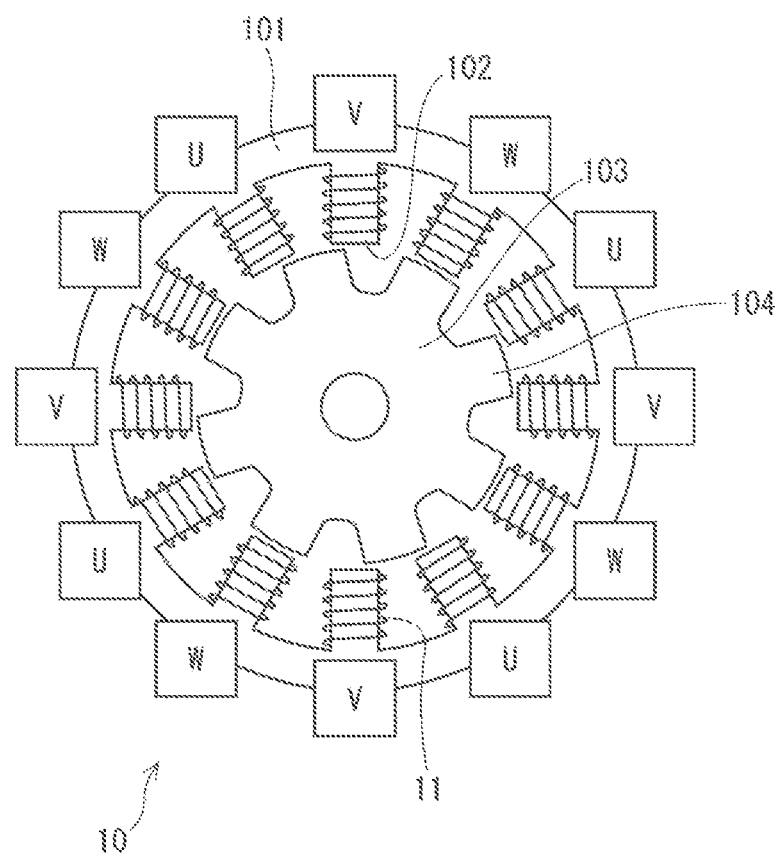
FIG. 3 is a schematic view showing a motor according to the one embodiment.
Figure 4:
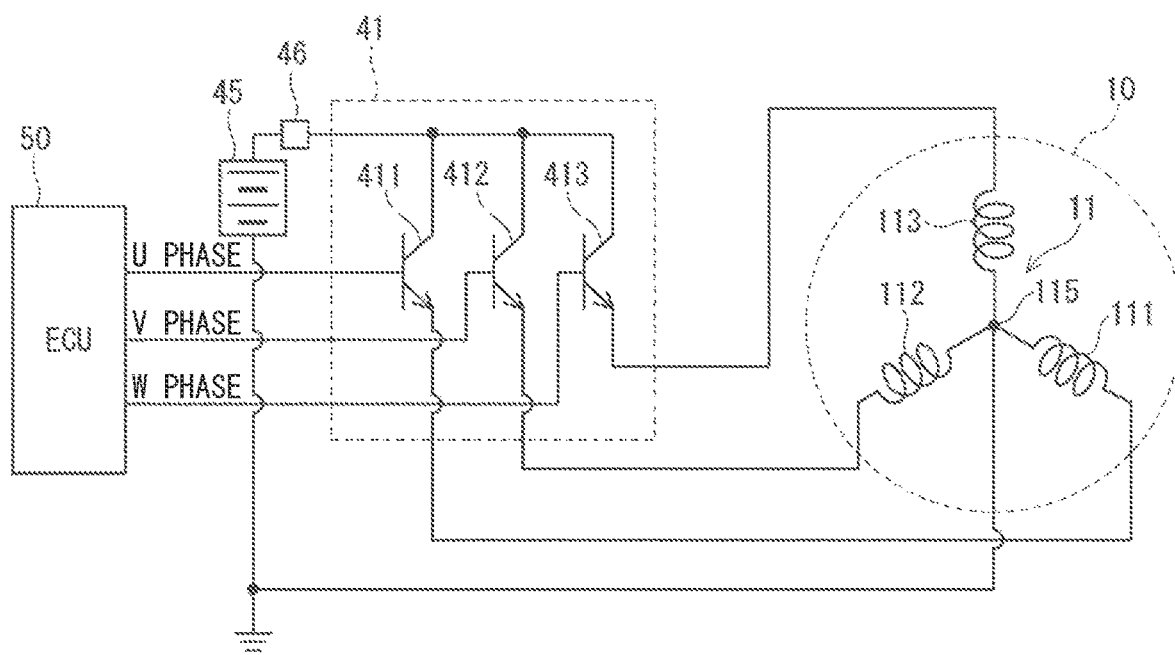
FIG. 4 is a circuit diagram showing a motor and a motor driver according to the one embodiment.

As shown in FIGS. 3 and 4, the motor 10 has a stator 101, a rotor 103, and a motor winding 11. The motor winding 11 has a U-phase coil 111, a V-phase coil 112, and a W-phase coil 113, and is wound around salient poles 102 of the stator 101. The coils 111 to 113 are connected by a connection portion 115. The connection portion 115 is connected to the ground. The rotor 103 has salient poles 104, is provided on the stator 101 so as to be relatively rotatable, and is rotationally driven by switching energization phases of the coils 111 to 113. In the present embodiment, the number of salient poles of the stator 101 is 12, and the number of salient poles of the rotor 103 is 8.

As shown in FIG. 2, the encoder 13 detects the rotational position of the rotor 103 of the motor 10. The encoder 13 is a magnetic rotary encoder, and includes a magnet that rotates integrally with the rotor 103, a Hall IC for magnetic detection, and the like. The encoder 13 outputs an encoder signal, which is phase A and phase B pulse signal, at each predetermined angle in synchronization with the rotation of the rotor 103.

A speed reducer 14 is provided between a motor shaft of the motor 10 and an output shaft 15 to decelerate the rotation of the motor 10 and output the decelerated rotation to the output shaft 15. As a result, the rotation of the motor 10 is transmitted to the shift range switching mechanism 20. The output shaft 15 is provided with an output shaft sensor 16 for detecting an angle of the output shaft 15. The output shaft sensor 16 is, for example, a potentiometer.

As shown in FIG. 1, the shift range switching mechanism 20, which is a detent mechanism, has a detent plate 21, a detent spring 25, a detent roller 26, and the like, and transmits a rotational driving force output from the speed reducer 14 to a manual valve 28 and the parking lock mechanism 30.

The detent plate 21 is fixed to the output shaft 15 and driven by the motor 10. The detent plate 21 has a pin 24 protruding in parallel with the output shaft 15. The pin 24 is connected to the manual valve 28. When the detent plate 21 is driven by the motor 10, the manual valve 28 reciprocates in an axial direction. In other words, the shift range switching mechanism 20 converts a rotational motion of the motor 10 into a linear motion and transmits the linear motion to the manual valve 28. The manual valve 28 is provided in a valve body 29. When the manual valve 28 reciprocates in the axial direction, a hydraulic supply path to a hydraulic clutch (not shown) is switched, and an engagement state of the hydraulic clutch is switched. In this way, the shift range is switched.

The detent plate 21 is provided with two valley portions 221 and 212 at portions close to the detent spring 25. In the present embodiment, the valley portion far from the base of the detent spring 25 is the valley portion 211, and the valley portion closer to the base is the valley portion 212. In the present embodiment, the valley portion 211 corresponds to a P range, and the valley portion 212 corresponds to a NotP range other than the P range.

The detent spring 25 is an elastically deformable plate-like member, and is provided with the detent roller 26 at a tip of the detent spring 25. The detent spring 25 urges the detent roller 26 toward the center of rotation of the detent plate 21. When a rotational force equal to or greater than a predetermined force is applied to the detent plate 21, the detent spring 25 is elastically deformed, and the detent roller 26 moves between the valley portions 211 and 212. When the detent roller 26 is fitted into any one of the valley portions 211 and 213, the swinging motion of the detent plate 21 is regulated, the axial position of the manual valve 28 and the state of the parking lock mechanism 30 are determined, and the shift range of an automatic transmission 5 is fixed.

Figure 5:
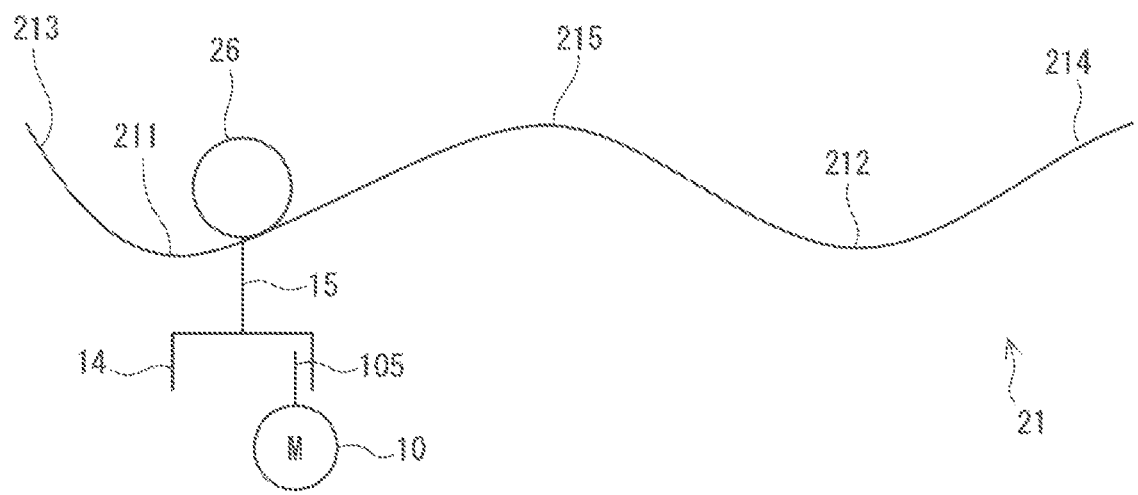
FIG. 5 is a schematic view showing a detent mechanism according to the one embodiment.

FIG. 5 schematically shows the relationship between a motor shaft 105, which is the rotation shaft of the motor 10, the output shaft 15, and the detent plate 21. As shown in FIG. 5, in the detent plate 21, a mountain portion 215 is formed between the valley portion 211 corresponding to the P range and the valley portion 212 corresponding to the NotP range. The detent roller 26 is located at the valley portion 211 when the shift range is the P range, and is located at the valley portion 212 when the shift range is the NotP range. Further, a state in which the detent roller 26 is located at the bottom of the valley portion 211 or 212 and the detent plate 21 does not rotate due to the spring force of the detent spring is defined as an "engaged state".

Further, a wall portion 213 that regulates the movement of the detent roller 26 is formed on the opposite side of the valley portion 211 from the mountain portion 215, and a wall portion 214 that regulates the movement of the detent roller 26 is formed on the opposite side of the valley portion 212 from the mountain portion 215. Hereinafter, the wall portion 213 on the P range side will be referred to as a "P wall", and the wall portion 214 on the NotP range side will be referred to as a "NotP wall" as appropriate.

A play is formed between the motor shaft 105 and the output shaft 15. In FIG. 5, the speed reducer 14 and the output shaft 15 are integrated, and a "play" is formed between the motor shaft 105 and the speed reducer 14, but the motor shaft 105 and the speed reducer 14 may be integrated and a "play" may be formed between the speed reducer 14 and the output shaft 15. The "play" can be regarded as the total amount of plays provided between the motor shaft 105 and the output shaft 15, and is appropriately referred to as "play G" below.

As shown in FIG. 1, the parking lock mechanism 30 includes a parking rod 31, a conical body 32, a parking lock pawl 33, a shaft portion 34, and a parking gear 35. The parking rod 31 is formed in a substantially L-shape, and one end 311 is fixed to the detent plate 21. The other end 312 of the parking rod 31 is provided with the conical body 32. The conical body 32 is formed to reduce in diameter toward the other end 312. When the detent plate 21 pivots in the reverse rotation direction, the conical body 32 moves in a P direction.

The parking lock pawl 33 is provided to abut on a conical surface of the conical body 32 and pivot about the shaft portion 34. On the parking gear 35 side of the parking lock pawl 33, a protrusion 331 is provided to be engageable with the parking gear 35. When the detent plate 21 rotates in the reverse rotation direction and the conical body 32 moves in the P direction, the parking lock pawl 33 is pushed up, and the protrusion 331 and the parking gear 35 engage with each other. On the other hand, when the detent plate 21 rotates in the forward rotation direction and the conical body 32 moves in a NotP direction, the engagement between the protrusion 331 and the parking gear 35 is released.

The parking gear 35 is provided on an axle (not shown) and is enabled to engage with the protrusion 331 of the parking lock pawl 33. When the parking gear 35 engages with the protrusion 331, the rotation of the axle is restricted. When the shift range is the NotP range, the parking gear 35 is not locked by the parking lock pawl 33, and the rotation of the axle is not hindered by the parking lock mechanism 30. When the shift range is the P range, the parking gear 35 is locked by the parking lock pawl 33 and the rotation of the axle is restricted.

As shown in FIG. 2 and FIG. 4, the shift range control device 40 includes a motor driver 41, an ECU 50 which is a controller, and the like. The motor driver 41 has switching elements 411 to 413, and switches the energization to each phase (U phase, V phase, W phase) of the motor 10. A motor relay 46 is provided between the motor driver 41 and the battery 45. When the motor relay 46 is turned on, the supply of electric power to the motor 10 is permitted, and when the motor relay 46 is turned off, the supply of electric power to the motor 10 is cut off.

The ECU 50 is mainly composed of a microcomputer and the like, and internally includes a CPU, a ROM, a RAM, an I/O, a bus line for connecting these components, and the like, which are not shown. Each processing in the ECU 50 may be software processing by executing a program stored in advance in a tangible memory device (that is, a readable non-transitory tangible recording medium) such as the ROM by the CPU, or may be hardware processing by a dedicated electronic circuit.

As shown in FIG. 2, the ECU 50 controls the switching of the shift range by controlling the drive of the motor 10 based on a driver-requested shift range, a signal from a brake switch, a vehicle speed, and the like. The ECU 50 controls the drive of a shift hydraulic control solenoid 6 based on the vehicle speed, an accelerator opening degree, the driver-requested shift range, and the like. By controlling the shift hydraulic control solenoid 6, the shift stage is controlled. The number of the shift hydraulic control solenoids 6 is determined according to the number of shift stages or the like. In the present embodiment, one ECU 50 controls the drive of the motor 10 and the solenoid 6, but a motor ECU for controlling the motor 10 and an AT-ECU for controlling the solenoid may be separated from each other. Hereinafter, a drive control of the motor 10 will be mainly described.

The ECU 50 includes an encoder count unit 51, an energization control unit 52, a learning unit 53, an energization phase count unit 54, an abnormality determination unit 55, and the like. The encoder count unit 51 counts pulse edges of each phase of the encoder signal output from the encoder 13 and calculates an encoder count value Ecnt. The encoder count value Ecnt is a value corresponding to the rotation position of the motor 10 and corresponds to the "motor angle".

The energization control unit 52 controls energization to the motor winding 11. The learning unit 53 learns a P wall position Wct as a reference position by wall abutting control for driving the motor 10 to a position where the detent roller 26 abuts on the wall portion 213. The P wall position Wct can also be regarded as a drive limit position of the detent roller 26 on the P range side. In the present embodiment, the learning of the P wall position will be mainly described, but the same control may be performed for the learning of the NotP wall position.

The energization phase count unit 54 calculates an energization phase count value Pcnt according to switching of the energization phase. The abnormality determination unit 55 determines the abnormality of the encoder 13 based on the encoder count value Ecnt and the energization phase count value Pcnt. In the present embodiment, the abnormality of the encoder 13 is determined based on a count deviation Δcnt, which is a value obtained by subtracting the encoder count value Ecnt from the energization phase count value Pcnt (see Equation (1)).

$$\Delta cnt = Pcnt - Ecnt \tag{1}$$

In the present embodiment, the rotation direction of the motor 10 when the detent roller 26 moves from the valley portion 211 to the valley portion 212 is a forward direction. Further, when the motor 10 rotates in the forward direction, the encoder count value Ecnt increases, and when the motor 10 rotates in a reverse direction, the encoder count value Ecnt decreases. Furthermore, the energization phase count value Pcnt also increases when the motor 10 is rotated in the forward direction and decreases when the motor 10 is rotated in the reverse direction. The definition of the rotation direction and the like may be different.

In the present embodiment, in order to perform feedback control using the encoder count value Ecnt, initial drive control for learning the relative positional relationship between the encoder 13 and the rotor 103 is performed when a start switch such as an ignition switch is turned on. Hereinafter, the start switch is referred to as IG.

Figure 6:
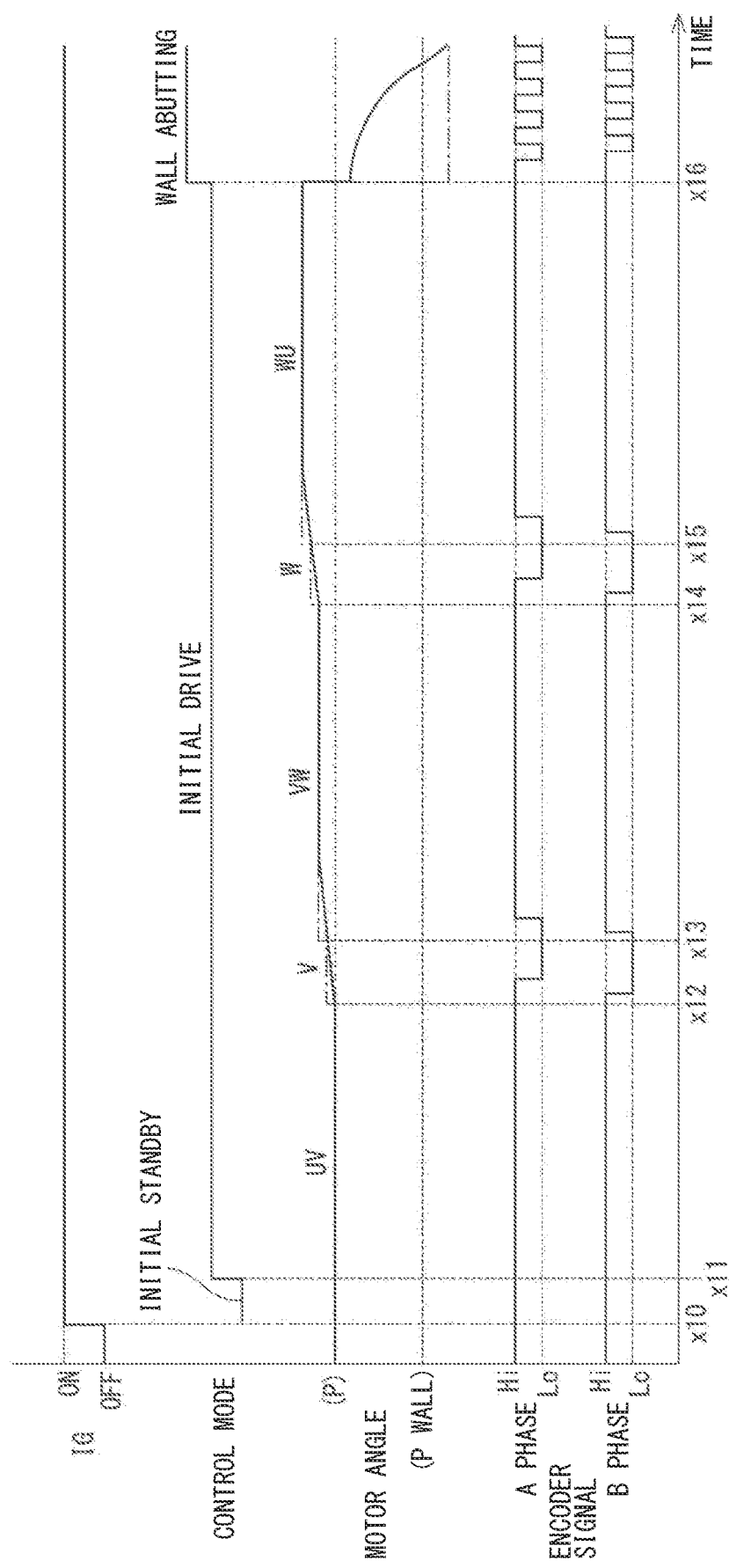
FIG. 6 is a time chart illustrating initial drive control according to the one embodiment.
Figure 7:
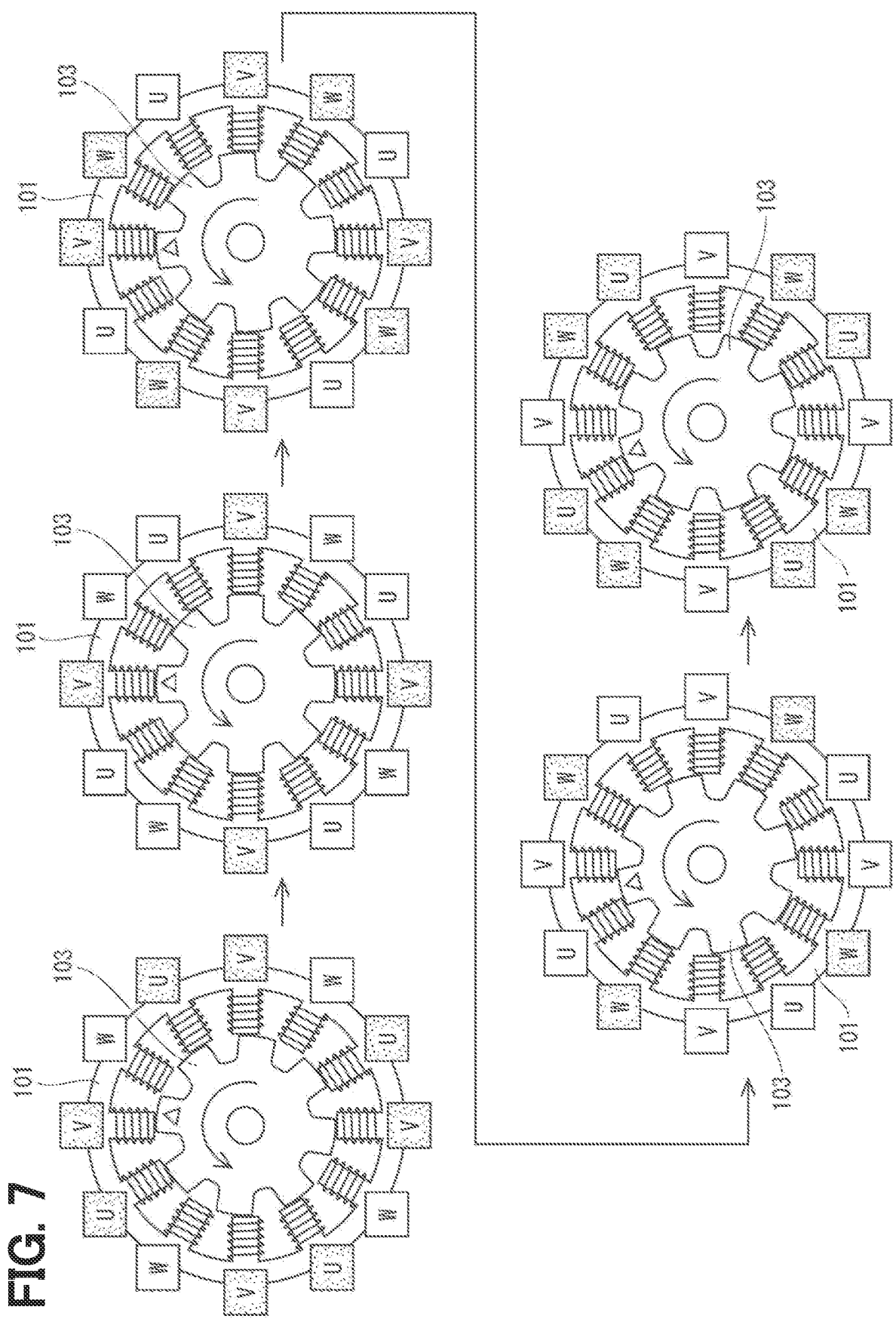
FIG. 7 is an explanatory diagram for explaining a positional relationship between a stator and a rotor during the initial drive control according to the one embodiment.

The initial drive control will be described with reference to FIGS. 6 to 8. FIG. 6 is a time chart for explaining the initial drive control, and shows IG on/off, a control mode, the motor angle, A-phase and B-phase encoder signals from the top. The motor angle is defined as (P) when the detent roller 26 is at the bottom of the valley portion 211 corresponding to the P range, and is defined as (P wall) when the detent roller 26 abuts on the wall portion 213. In addition, a command value is indicated by the alternate long and short dash line, and the actual rotor position is indicated by the solid line.

When the IG is turned on at the time x10, the initial drive control is started at the time x11 after an initial standby. In the initial drive control, the motor 10 is rotated in the forward direction within the range of the play by open control in which the energization phase is switched at predetermined time intervals without using the encoder count value Ecnt. Here, the play is the total amount of plays provided between the motor shaft of the motor 10 and the output shaft 15, and the motor shaft does not receive the spring force of the detent spring 25 within the play range.

In the example of FIG. 6, two-phase energization to the UV phases is performed from time x11 to time x12, one-phase energization to the V phase is performed from time x12 to time x13, two-phase energization to the VW phases is performed from time x13 to time x14, one-phase energization to the W phase is performed from time x14, and two-phase energization to the WU phases is performed from time x15 to time x16. As a result, the rotor 103 rotates as shown in FIG. 7. In FIG. 7, the energization phase is indicated by dotted pattern. Further, in FIG. 7, one salient pole 104 of the rotor 103 is marked with a triangle to explain the rotational state. The same applies to FIG. 8 and FIG. 9.

In the present embodiment, the time for two-phase energization is secured to the extent that the rotor position is stable. On the other hand, in the one-phase energization, the one-phase energization time is shorter than the two-phase energization time because it is sufficient that the energization time is such that the energization phase can be stably switched. As a result, the time required for the initial drive control can be shortened.

Figure 8:
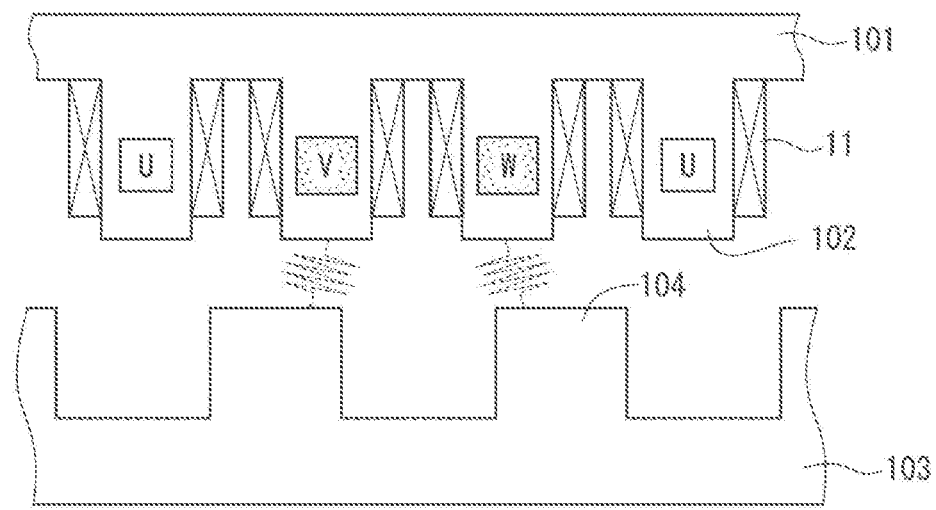
FIG. 8 is an explanatory diagram illustrating a positional relationship between a stator and a rotor when two-phase energization is performed according to the one embodiment.
Figure 9:
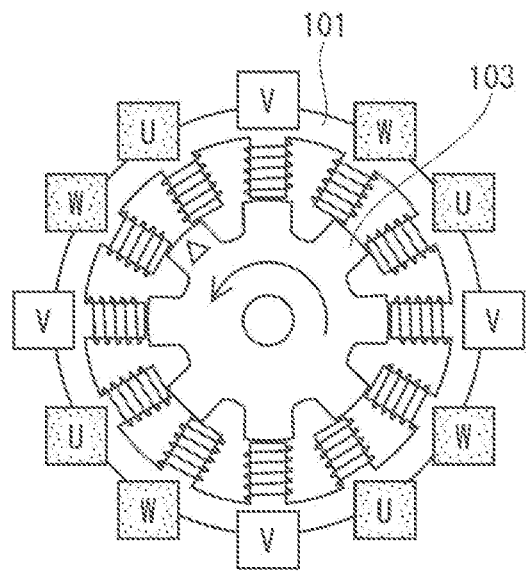
FIG. 9 is an explanatory diagram for explaining a positional relationship between a stator and a rotor when the initial drive control fails according to the one embodiment.

As shown in FIG. 8, for example, when two-phase energization to the VW phase is performed, if it is normal, the positional relationship becomes stable in a state of "two-phase two teeth" in which the salient poles 102 of the stator 101 around which the V-phase coil 112 or the W-phase coil 113 is wound face the two salient poles 104 of the rotor 103. At this time, as shown in FIG. 6, the output from the encoder 13 is Hi for both the A-phase signal and the B-phase signal. On the other hand, for example, when the initial drive fails due to the overlap of the timing between the initial drive control of the shift-by-wire system 1 and the cranking of the engine (not shown), as shown in FIG. 9, the positional relationship becomes a state of "two-phase one-tooth" in which the two salient poles 102 of the stator 101 around which the coil of the energization phase is wound face the one salient pole 104 of the rotor 103. At this time, as the output from the encoder 13, both the A-phase signal and the B-phase signal are Lo.

Therefore, in the present embodiment, if both the A-phase signal and the B-phase signal are Hi during the two-phase energization, the initial drive is completed, and the process shifts to wall abutting control for learning the P wall position Wcnt. If the A-phase signal and the B-phase signal are Lo during the two-phase energization, the initial drive control is retried. In the example of FIG. 6, the initial drive is completed when the two-phase energization is performed for the third time, but the number of times of switching the energization phase in the initial drive control, the number of retries, and the like can be set to any values.

Figure 10:
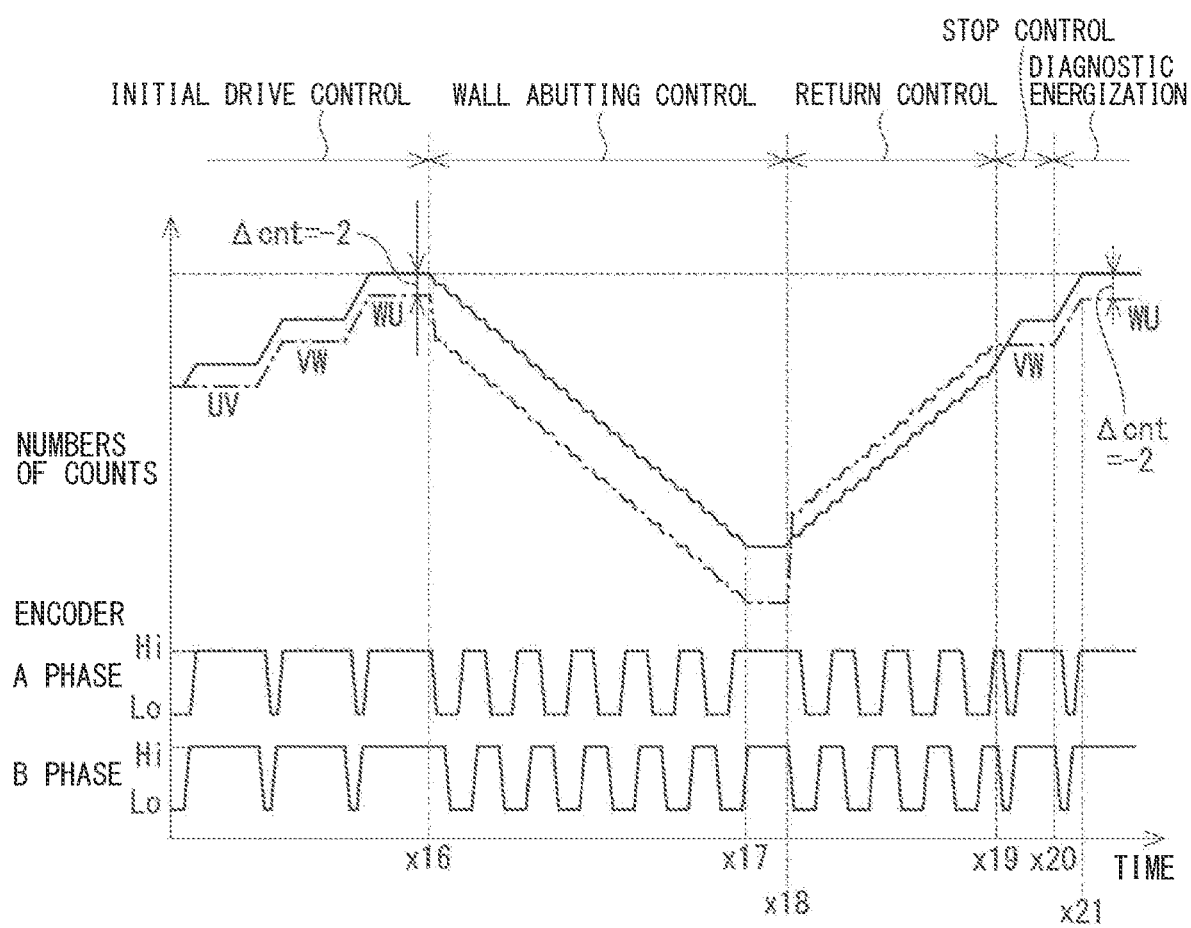
FIG. 10 is a time chart illustrating a diagnostic process according to the one embodiment.
Figure 11:
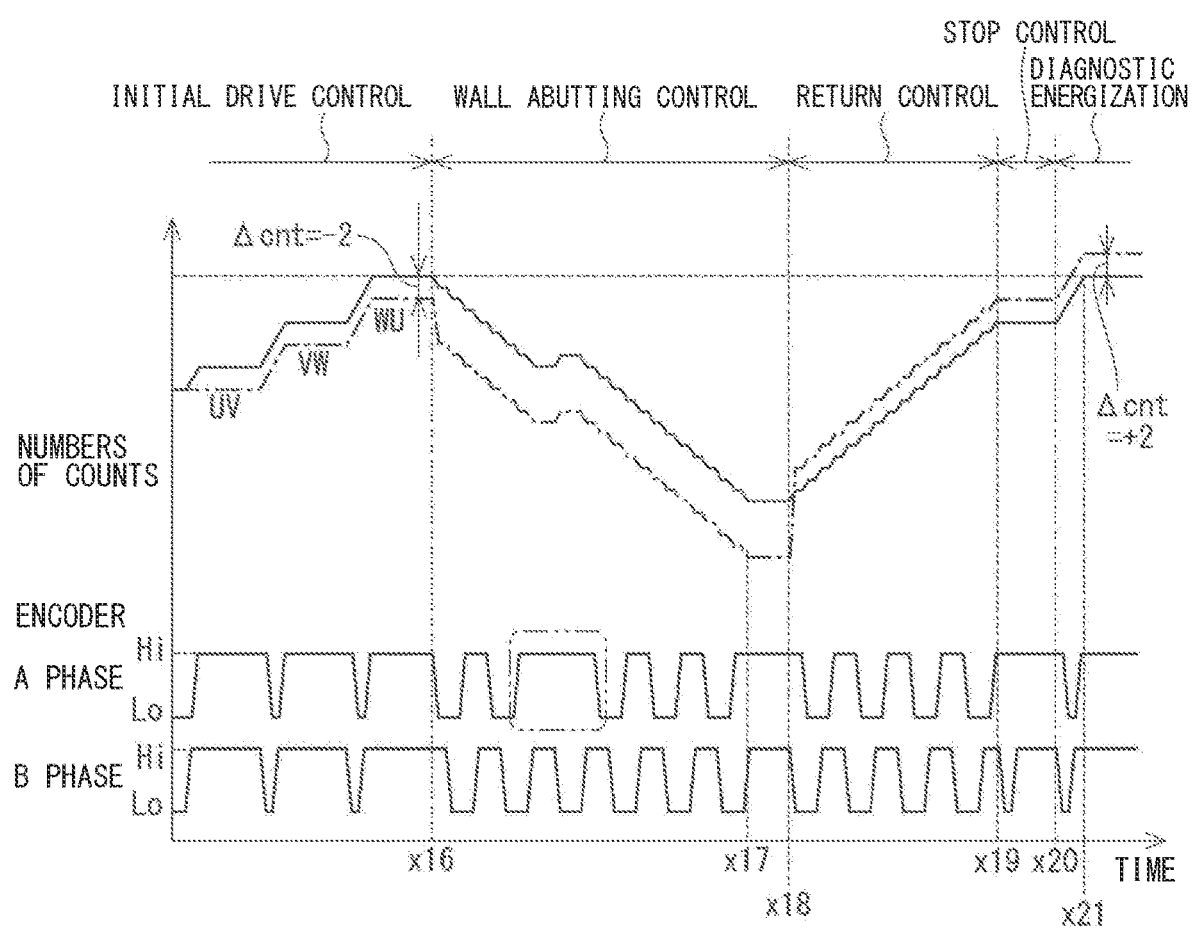
FIG. 11 is a time chart illustrating the diagnostic process according to the one embodiment.

The diagnostic process of the present embodiment will be described with reference to the time charts of FIGS. 10 and 11. In FIGS. 10 and 11, the numbers of counts of the encoder and the energization phase are shown in the upper row, and the encoder signal is shown in the lower row. Regarding the numbers of counts, the encoder count value Ecnt is shown by the solid line, the energization phase count value Pcnt is shown by the alternate long and short dash line, and examples of the energization phases are also shown.

As shown in FIG. 10, a deviation occurs between the encoder count value Ecnt and the energization phase count value Pcnt during the initial drive control according to the relative positions of the stator 101 and the rotor 103 when the IG is on. When the WU phases are energized, since both the encoder signals of the A phase and the B phase are Hi, it is determined that the initial drive is successful. In the example of FIG. 10, the count deviation Δcnt at the completion of the initial drive is −2.

From the time x16 when the initial drive is completed, the motor 10 is rotated in the reverse direction by switching the energization phase according to the encoder count value Ecnt, and the P wall position Wcnt is learned by the wall abutting control. When the detent roller 26 abuts on the wall on the P range side of the detent plate 21 at time x17, the encoder count value Ecnt at this time is learned as the P wall position Wcnt.

When the learning of the P wall position Wcnt is completed, the return control is performed from the time x18. In the return control, a target count value Tcnt is set so that the detent roller 26 returns to the bottom of the valley portion 211, and the motor 10 is rotated in the forward direction so that the encoder count value Ecnt becomes the target count value Tcnt.

When the encoder count value Ecnt reaches a control range (for example, ±2 counts) including the target count value Tcnt at time x19, the motor 10 is stopped by stop control. The stop control is a fixed-phase energization to the two phases according to the encoder count value Ecnt, and in the example of FIG. 10, the VW phases are energized. During the stop control, the relative positional relationship between the stator 101 and the rotor 103 may not be two-phase two-tooth due to the influence of inertia. Further, after the stop control, the energization to the motor 10 is temporarily turned off. In FIGS. 10 and 11, in addition to the period during which the fixed-phase energization is performed, the energization off period is also included in the "stop control".

From time x20 after the fixed-phase energization and energization off, diagnostic energization is performed to switch the energization phase so that the encoder count value Ecnt becomes the same value as when the initial drive is completed. The rotation direction of the motor 10 during the diagnostic energization is the same as that at the time of the initial drive. The energization phase at time x21 when the encoder count value Ecnt matches the value at the time when the initial drive is completed is the WU phases, and the energization phase is different from that during the stop control. At this time, if the encoder 13 is normal, the count deviation Δcnt is −2, which is the same as when the initial drive is completed.

On the other hand, as surrounded by the long dashed double-short dashed line in FIG. 11, when a missing of the encoder signal pulse occurs during the wall abutting control, the encoder count value Ecnt when the detent roller 26 abuts on the wall on the P range side may be different from the normal time, and there is a risk that the learning of the P wall position Wct will be mistaken. Further, when a pulse missing of the encoder signal occurs, the count deviation Δcnt after the time x18 after the completion of the wall abutting does not match the value at the time of the completion of the initial drive. For example, in the example of FIG. 11, the count deviation Δcnt when the initial drive is completed is −2, whereas the count deviation Δcnt after the time x18 is +2, which is different from that at the time of the completion of the initial drive.

Therefore, in the present embodiment, the abnormality of the encoder signal is detected by comparing the initial deviation Gcnt1 which is the count deviation Δcnt when the initial drive is completed and the diagnostic initial deviation Gcnt2 which is the count deviation Δcnt after learning the P wall position Wcnt. In the present embodiment, the encoder abnormality is determined based on the count deviation Δcnt at the time when the motor 10 is returned to the point where the encoder count value Ecnt becomes the same value as when the initial drive is completed, and the count deviation Δcnt at the time of completion of the initial drive. Note that FIG. 11 shows an example in which the pulse missing occurs in the A-phase signal, but the same applies to the case where a pulse missing occurs in the B-phase signal.

Figure 12:
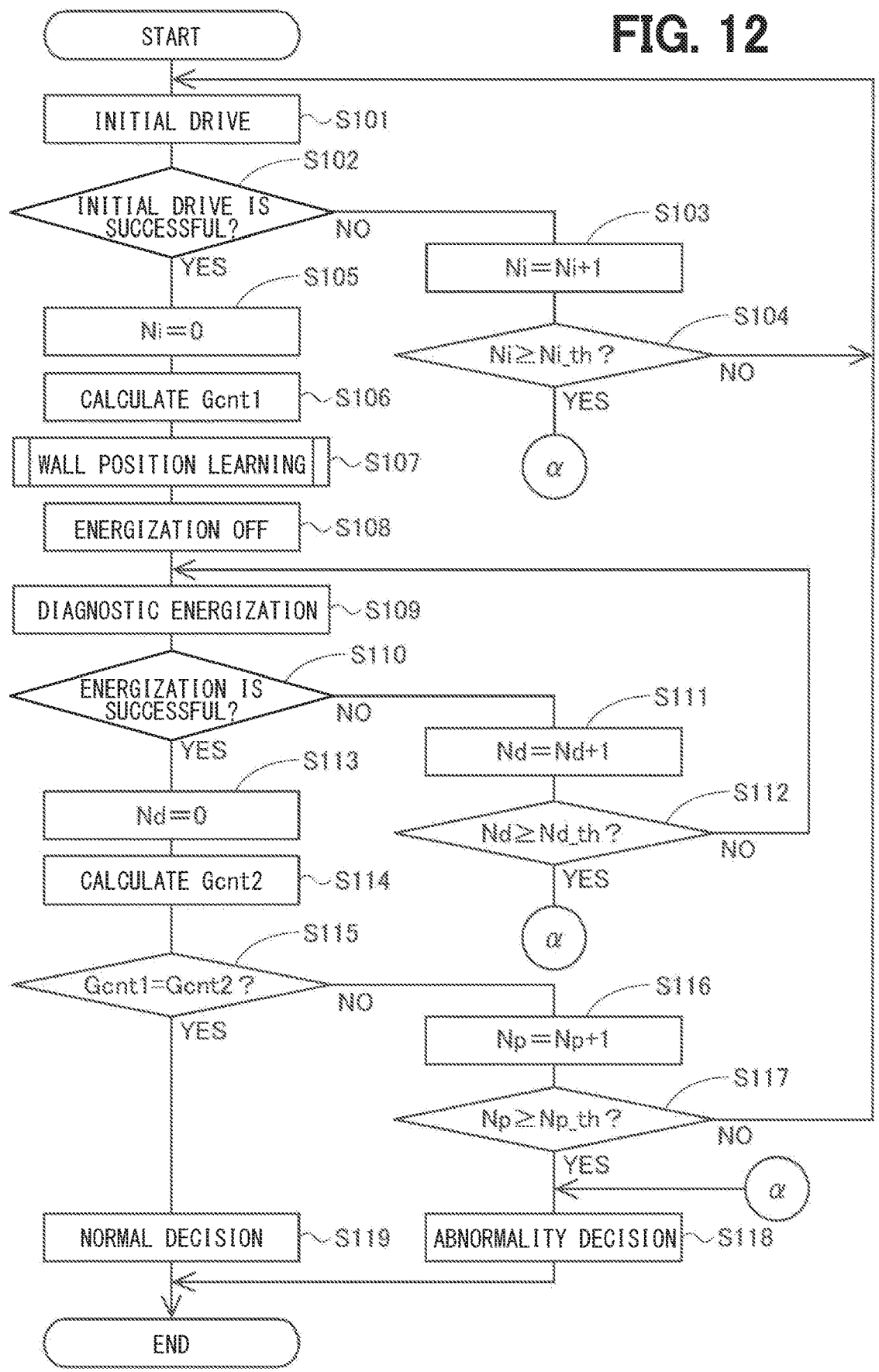
FIG. 12 is a flowchart illustrating the diagnostic process according to the one embodiment.
Figure 13:
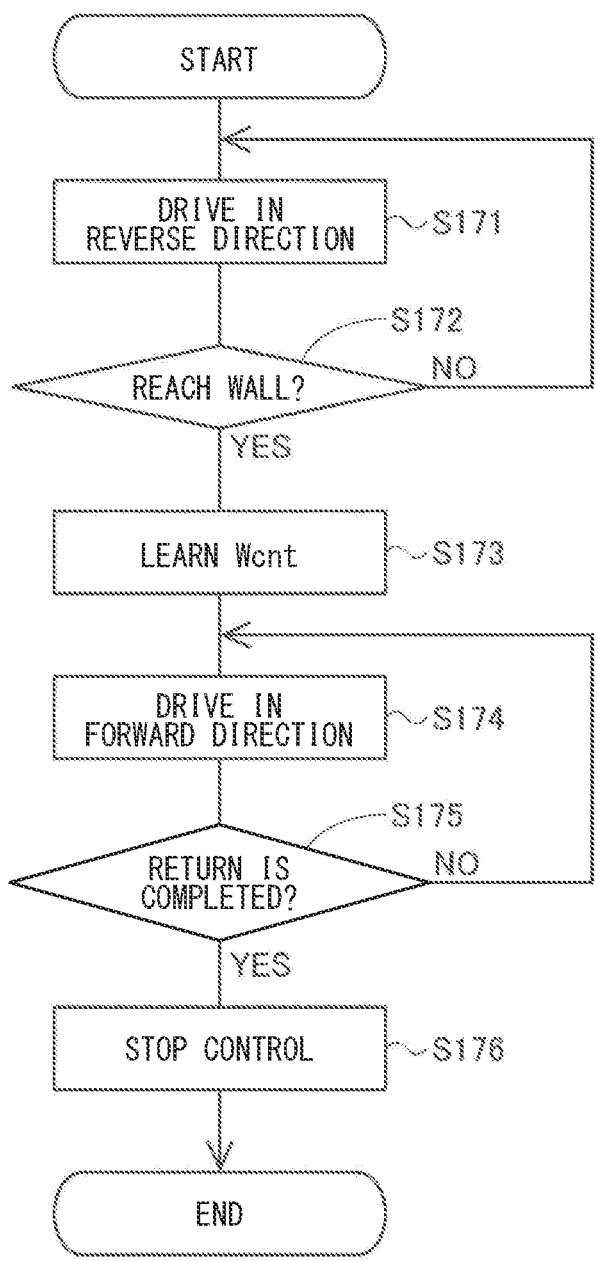
FIG. 13 is a flowchart illustrating a wall position learning process according to the one embodiment.

The diagnostic process of the present embodiment will be described with reference to the flowchart of FIG. 12. This process is executed by the ECU 50 when the IG is turned on. Hereinafter, a "step" in step S101 is omitted and is simply referred to as the symbol "S". The other steps are the same.

When the IG is turned on, the initial drive is performed in S101. In the initial drive, as described with reference to FIG. 6 and the like, the motor 10 is rotated in the forward direction within the range of the play by open control. In S102, the abnormality determination unit 55 determines whether or not the initial drive is successful. Here, when the encoder signal at the time of two-phase energization is Hi for both the A phase and the B phase, it is determined that the initial drive is successful. When it is determined that the initial drive is successful (S102: YES), the process proceeds to S105. When it is determined that the initial drive has failed (S102: NO), the process proceeds to S103.

In S103, the abnormality determination unit 55 increments an initial drive retry count Ni. In S104, the abnormality determination unit 55 determines whether or not the initial drive retry count Ni is equal to or greater than a determination threshold value Ni_th. The determination threshold value Ni_th is the number of retries until the abnormality is confirmed, and is set to any value. The same applies to determination threshold values Nd_th and Np_th described later. The number of retries may be the same or different. When it is determined that the initial drive retry count Ni is less than the determination threshold value Ni_th (S104: NO), the process returns to S101 and a retry of the initial drive is performed. When it is determined that the initial drive retry count Ni is equal to or greater than the determination threshold value Ni_th (S104: YES), the process proceeds to S118 and the abnormality is confirmed.

In S105, to which the process proceeds when the initial drive is successful (S102: YES), the abnormality determination unit 55 initializes the initial drive retry count Ni and sets Ni=0. In S106, the abnormality determination unit 55 calculates the count deviation Δcnt from the encoder count value Ecnt and the energization phase count value Pcnt when it is determined that the initial drive is successful, sets the calculated value as the initial deviation Gcnt1, and stores the initial deviation Gcnt1 in a storage or the like in association with the encoder count value Ecnt at the time.

In S107 to which the process proceeds subsequently, wall position learning process is performed. The wall position learning process will be described based on the sub-flow shown in FIG. 13. In S171, the energization control unit 52 rotates the motor 10 in the reverse direction by switching the energization phase according to the encoder count value Ecnt.

In S172, the learning unit 53 determines whether or not the detent roller 26 has reached the wall portion 213. Here, when the minimum value of the encoder count value Ecnt is not updated for a continuation determination time or longer, it is determined that the detent roller 26 has reached the wall portion 213. The continuation determination time is set so that the state in which the detent roller 26 is driven is not erroneously determined to have reached the wall position. When it is determined that the detent roller 26 has not reached the wall portion 213 (S172: NO), the process returns to S171 and driving of the motor 10 is continued. When it is determined that the detent roller 26 has reached the wall portion 213 (S172: YES), the process proceeds to S173.

In S173, the learning unit 53 learns the encoder count value Ecnt when it is determined that the detent roller 26 been reached the P wall as the P wall position Wcnt, and stores it in a storage unit or the like (not shown).

In S174, the energization control unit 52 sets a target count value Tcnt in order to return the detent roller 26 to the bottom of the valley portion 211, and rotates the motor 10 in the forward direction based on the encoder count value Ecnt. The target count value Tcnt can be changed as appropriate.

In S175, the energization control unit 52 determines whether or not the return control for returning the detent roller 26 to the bottom of the valley portion 211 is completed. Here, when the encoder count value Ecnt is within the control range including the target count value Tcnt, it is determined that the return control is completed. When it is determined that the return control is not completed (S175: NO), the process returns to S174 and the driving of the motor 10 is continued. When it is determined that the return control is completed (S175: YES), the process proceeds to S176, stop control is performed by fixed phase energization, and the motor 10 is stopped. When the stop control is completed, the wall position learning process is completed, and the process proceeds to S108 in FIG. 12.

Returning to FIG. 12, in S108 to which the process proceeds after the wall position learning process is completed, the energization control unit 52 cuts off the energization of the motor 10. In S109, the energization control unit 52 performs diagnostic energization. In the diagnostic energization, the energization phase is switched so that the encoder count value Ecnt becomes a value stored in association with the initial deviation Gcnt1.

In S110, the abnormality determination unit 55 determines whether or not the diagnostic energization is successful. Here, as in S102, when the encoder signal at the time of two-phase energization is Hi for both the A phase and the B phase, it is determined that the diagnostic energization is successful. When it is determined that the diagnostic energization is successful (S110: YES), the process proceeds to S113. When it is determined that the diagnostic energization has failed (S110: NO), the process proceeds to S111.

In S111, the abnormality determination unit 55 increments the number of diagnostic energization retries Nd. In S112, the abnormality determination unit 55 determines whether or not the number of diagnostic energization retries Nd is equal to or greater than a determination threshold value Nd_th. When it is determined that the number of diagnostic energization retries Nd is less than the determination threshold value Nd_th (S112: NO), the process returns to S109 and the diagnostic energization retry is performed. When it is determined that the number of diagnostic energization retries Nd is equal to or greater than the determination threshold value Nd_th (S112: YES), the process proceeds to S118 and the abnormality is confirmed.

In S113 to which the process proceeds when the diagnostic energization is successful (S110: YES), the abnormality determination unit 55 initializes the number of diagnostic energization retries Nd and sets Nd=0. In S114, the abnormality determination unit 55 calculates the count deviation Δcnt using the encoder count value Ecnt and the energization phase count value Pcnt when it is determined that the diagnostic energization is successful, and uses the calculated value as the diagnostic initial deviation Gcnt2.

In S115, the abnormality determination unit 55 determines whether or not the initial deviation Gcnt1 and the diagnostic initial deviation Gcnt2 match. When it is determined that the initial deviation Gcnt1 and the diagnostic initial deviation Gcnt2 match (S115: YES), the process proceeds to S119. When it is determined that the initial deviation Gcnt1 and the diagnostic initial deviation Gcnt2 do not match (S115: NO), the process proceeds to S116. At this time, since the P wall position Wcnt learned in S173 may be erroneously learned, the P wall position Wcnt is discarded.

In S116, the abnormality determination unit 55 increments the number of the pulse abnormality diagnoses Np. In S117, the abnormality determination unit 55 determines whether or not the number of pulse abnormality diagnoses Np is equal to or greater than a determination threshold Np_th. When it is determined that the number of pulse abnormality diagnoses Np is less than the determination threshold value Np_th (S117: NO), the process returns to S101 and a retry from the initial learning is performed. When it is determined that the number of pulse abnormality diagnoses Np is equal to or greater than the determination threshold value Np_th (S117: YES), the process proceeds to S118 and the abnormality is confirmed.

In S119 to which the process proceeds when the initial deviation Gcnt1 and the diagnostic initial deviation Gcnt2 match (S115: YES), the abnormality determination unit 55 confirms that a relationship between the encoder signal and the relative position between the stator 101 and the rotor 103 is normal. Further, the number of pulse abnormality diagnoses Np is initialized so that Np=0. After that, the process related to the shift range switching is performed using the P wall position Wcnt learned in S173.

When no abnormality such as pulse missing occurs in the encoder signal, the relationship between the encoder count value Ecnt and the energization phase count value Pcnt is maintained between the initial drive and after the P wall abutting. On the other hand, if an abnormality occurs in the encoder signal during wall position learning, the relationship between the encoder count value Ecnt and the energization phase count value Pcnt deviates between the initial drive and after the P wall abutting.

Therefore, in the present embodiment, the abnormality of the encoder signal is detected by comparing the initial deviation Gcnt1 which is the count deviation Δcnt when the initial drive is completed and the diagnostic initial deviation Gcnt2 which is the count deviation Δcnt after the P wall abutting. Specifically, when the initial deviation Gcnt1 and the diagnostic initial deviation Gcnt2 do not match, it is determined that an abnormality of the encoder signal has occurred during the wall abutting learning, and the learning of the P wall position Wcnt is repeated. As a result, it is possible to prevent range switching control based on the P wall position Wcnt that has been erroneously learned.

Further, in the present embodiment, the learning of the diagnostic initial deviation Gcnt2 is performed at the same position as the completion of the initial drive. The position of the detent roller 26 when the initial drive is completed is a position where the detent roller 26 does not move due to the spring force of the detent spring 25. In this way, by using the value at the position where the detent roller 26 does not move, it is possible to prevent erroneous determination.

As described above, the shift range control device 40 switches the shift range by controlling the driving of the motor 10 in the shift-by-wire system 1. The shift-by-wire system 1 includes the motor 10, the output shaft 15, and the shift range switching mechanism 20. The encoder 13 outputs the encoder signal which is the detection signal according to the rotation position of the motor 10.

The shift range switching mechanism 20 includes the detent plate 21 and the detent roller 26. The detent plate 21 is formed with the plurality of valley portions 211, 212 and the plurality wall portions 213, 214 provided at both ends of the plurality of valley portions 211, 212, and rotates integrally with the output shaft 15 to which the rotation of the motor 10 is transmitted. The detent roller 26 is engageable with one of the valley portions 221 and 222 according to the shift range.

The shift range control device 40 includes the encoder count unit 51, the energization control unit 52, the learning unit 53, the energization phase count unit 54, and the abnormality determination unit 55. The encoder count unit 51 calculates the encoder count value Ecnt based on the encoder signal. The energization control unit 52 controls energization to the motor 10. The learning unit 53 learns the wall position Wcnt, which is the encoder count value Ecnt when the detent roller 26 abuts on the wall portion 213. The energization phase count unit 54 calculates the energization phase count value Pcnt that is counted according to switching of the energization phase. The abnormality determination unit 55 determines the abnormality of the encoder 13 based on the energization phase count value Pcnt and the encoder count value Ecnt before and after learning the wall position. As a result, the abnormality of the encoder 13 at the time of wall abutting learning can be appropriately detected.

The motor 10 is a three-phase motor, and the energization phase count value Pcnt and the encoder count value Ecnt at the time of two-phase energization are used for determining the abnormality of the encoder 13. During the two-phase energization, the holding power is higher than during the one-phase energization, the abnormality can be determined more appropriately.

The energization control unit 52 performs the initial drive control to rotate the motor 10 within the range of the play G without using the encoder count value Ecnt, the wall abutting control to rotate the motor 10 to a position where the detent roller 26 abuts on the wall portion 213, and the return control to rotate the motor 10 in the direction in which the detent roller 26 is separated from the wall portion 213 after the wall abutting control, in the stated order. The abnormality determination unit 55 determines that the encoder 13 is abnormal when the initial deviation Gcnt1, which is the difference between the energization phase count value Pcnt and the encoder count value Ecnt when the initial drive control is completed, is different from the diagnostic initial deviation Gcnt2, which is the difference between the energization phase count value Pcnt and the encoder count value Ecnt after the return control is started. As a result, the abnormality of the encoder 13 can be detected appropriately.

The shift range switching mechanism 20 includes the detent spring 25 that urges the detent roller 26 in the direction of fitting into the valley portions 211 and 212. The initial deviation Gcnt1 and the diagnostic initial deviation Gcnt2 are calculated in the engaged state in which the detent roller 26 is fitted at a position where the shift range switching mechanism 20 is not driven by the urging force of the detent spring 25. As a result, the abnormality of the encoder 13 can be more appropriately determined in a state where the motor 10 is not driven by the spring force of the detent spring 25.

The energization control unit 52 drives the motor 10 to a position where the detent roller 26 is engaged by the return control, and then stops the motor 10 by the fixed-phase energization. The diagnostic initial deviation Gcnt2 is calculated after the stop control. As a result, the abnormality of the encoder 13 can be detected appropriately.

The diagnostic initial deviation Gcnt2 is calculated by using the encoder count value Ecnt and the energization phase count value Pcnt when the diagnostic energization is performed after the stop control and the encoder count value Ecnt becomes the same value as when the initial deviation Gcnt1 is calculated. That is, the diagnostic initial deviation Gcnt2 is calculated at the same position as when the initial drive control is completed. As a result, the diagnostic initial deviation Gcnt2 is calculated in a state where the detent roller 26 is securely in the engaged state and the motor 10 is not driven by the detent spring 25, so that the abnormality of the encoder 13 can be determined more appropriately.

The diagnostic energization is performed after the stop control and the energization to the motor 10 is turned off. As a result, the abnormality of the encoder 13 can be more appropriately determined without being affected by the inertia of the motor 10 due to the return control.

The diagnostic initial deviation Gcnt2 is calculated using the encoder count value Ecnt and the energization phase count value Pcnt when the energization is performed to the phase different from the phase that is energized during the stop control. In the stop control, two-phase and one-tooth may occur due to the influence of inertia, therefore, it is possible to prevent an erroneous determination by changing the energization phase from the stop control.

When the abnormality determination unit 55 determines that the encoder 13 is abnormal, the learning unit 53 relearns the wall position Wcnt. As a result, the wall position Wcnt can prevent an erroneous learning.

When the number of times of learning the wall position Wcnt is equal to or greater than the determination threshold value, the abnormality determination unit 55 confirms the abnormality of the encoder 13. Specifically, when the number of pulse abnormality diagnoses Np, which is the number of times the initial deviation Gcnt1 and the diagnostic initial deviation Gcnt2 do not match, becomes equal to or greater than the determination threshold Np_th (S115: NO, S116, S117: YES), the encoder 13 confirms the abnormality of the encoder 13. As a result, the abnormality of the encoder 13 can be appropriately determined.

In the present embodiment, the shift-by-wire system 1 is a "shift range switching system", the detent plate 21 is a "rotating member", the detent roller 26 is an "engaging member", the detent spring 25 is an "urging member", and the spring force of the detent spring 25 corresponds to the "urging force". Further, the number of pulse abnormality diagnoses Np corresponds to the "number of times of learning", and the determination threshold value Np_th corresponds to the "determination threshold value".

Other Embodiments

In the above embodiment, the diagnostic initial value is calculated based on the encoder count value and the energization phase count value at the time of diagnostic energization after the return control, the stop control, and the energization is turned off. In another embodiment, the diagnostic initial value can be calculated at an any timing after the start of the return control (after the time x18 in FIG. 10) and before the start of the shift range switching. Further, the process of turning off the energization after the stop control may be omitted. In the above embodiment, an abnormality of the encoder is determined based on the count deviation during the two-phase energization. In another embodiment, an abnormality of the encoder may be determined based on the count deviation during one-phase energization. During the one-phase energization, the stator and the rotor face each other in a state of one-phase and one tooth in a normal time, and both the A-phase signal and the B-phase signal become Lo.

According to the above embodiment, two valley portions are formed in the detent plate. In another embodiment, the number of valley portions is not limited to two, and for example, a valley portion may be provided for each range. The shift range switching mechanism, the parking lock mechanism, and the like may be different from those of the above embodiment. In the above embodiment, the potentiometer is exemplified as the output shaft sensor. In another embodiment, the output shaft sensor may be any sensor. The output shaft sensor may be omitted.

In the embodiment described above, the speed reducer is provided between the motor shaft and the output shaft. Although the detail of the speed reducer is not mentioned in the above-described embodiments, the speed reducer may have any configuration, such as one using a cycloid gear, a planetary gear, or a spur gear that transmits a torque from a speed reduction mechanism substantially coaxial with the motor shaft to the drive shaft, and one using these gears in combination. In another embodiment, the speed reducer between the motor shaft and the output shaft may be omitted, or a mechanism except for the speed reducer may be provided. The present disclosure is not limited to the embodiment described above but various modifications may be made within the scope of the present disclosure.

The units in the ECU 50 and the methods described in the present disclosure may be implemented by a dedicated computer which is configured with a memory and a processor programmed to execute one or more particular functions embodied in computer programs of the memory. Alternatively, the units in the ECU 50 and the methods according to the present disclosure may be achieved by a dedicated computer which is configured with a processor with one or more dedicated hardware logic circuits. Alternatively, the units in the ECU 50 and the methods according to the present disclosure may be achieved using one or more dedicated computers which is configured by a combination of a processor and a memory programmed to execute one or more functions and a processor with one or more hardware logic circuits. The computer programs may be stored, as instructions to be executed by a computer, in a tangible non-transitory computer-readable medium.

The present disclosure has been described in accordance with the embodiments. However, the present disclosure is not limited to such embodiments and structures. The present disclosure also encompasses various modifications and variations within the scope of equivalents. Furthermore, various combination and formation, and other combination and formation including one, more than one or less than one element may be made in the present disclosure.

What is claimed is:

1. A shift range control device for switching a shift range by controlling driving of a motor in a shift range switching system that includes:
   a motor;
   an encoder configured to output an encoder signal that is a detection signal according to a rotation position of the motor; and
   a shift range switching mechanism including a rotating member and an engaging member, the rotating member formed with a plurality of valley portions and a plurality of wall portions provided at both ends of the plurality of valley portions, and rotating integrally with an output shaft to which a rotation of the motor is transmitted, the engaging member capable of engaging with one of the plurality of valley portions according to the shift range, the shift range control device comprising:
   an encoder count unit configured to calculate an encoder count value based on the encoder signal;
   an energization control unit configured to control energization to the motor;
   a learning unit configured to learn a wall position that is the encoder count value when the engaging member abuts on one of the plurality of wall portions;
   an energization phase count unit configured to calculate an energization phase count value that is counted according to switching of the energization phase; and
   an abnormality determination unit configured to determine an abnormality of the encoder based on the energization phase count value and the encoder count value before and after learning the wall position.

2. The shift range control device according to claim 1, wherein
   the motor is a three-phase motor, and
   the abnormality determination unit is further configured to use the energization count value and the encoder count value during two-phase energization for determining the abnormality of the encoder.

3. The shift range control device according to claim 1, wherein
   the energization control unit is further configured to perform initial drive control, wall abutting control, and return control in a stated order, the initial drive control is control to rotate the motor without using the encoder count value, the wall abutting control is control to rotate the motor to a position where the engaging member abuts on the one of the plurality of wall portions, and the return control is control to rotate the motor in a direction in which the engaging member is separated from the one of the plurality of wall portions after the wall abutting control, and the abnormality determination unit is further configured to determine that the abnormality has occurred in the encoder when an initial deviation, which is a difference between the energization phase count value and the encoder count value when the initial drive control is completed, is different from a diagnostic initial deviation, which is a difference between the energization phase count value and the encoder count value after the return control is started.

4. The shift range control device according to claim 3, wherein
the shift range switching mechanism further includes an urging member configured to urge the engaging member in a direction of fitting into one of the plurality of valley portions, and
the initial deviation and the diagnostic initial deviation are calculated in an engage state where the engaging member is fitted at a position where the shift range switching mechanism is not driven by an urging force of the urging member.

5. The shift range control device according to claim 4, wherein
the energization control unit is further configured to perform stop control to stop the motor by a fixed-phase energization after driving the motor to a position where the engaging member is in the engaged state by the return control, and
the diagnostic initial deviation is calculated after the stop control.

6. The shift range control device according to claim 5, wherein
diagnostic energization is performed after the stop control, and the diagnostic initial deviation is calculated based on the encoder count value and the energization phase count value at a time when the encoder count value becomes a same value as the encoder count value when the initial deviation is calculated.

7. The shift range control device according to claim 6, wherein
the diagnostic energization is performed after the energization to the motor is turned off after the stop control.

8. The shift range control device according to claim 5, wherein
the diagnostic initial deviation is calculated by using the encoder count value and the energization phase count value when the phase different from the energization phase in the stop control is energized.

9. The shift range control device according to claim 1, wherein
the learning unit is further configured to re-learn the wall position when the abnormality determination unit determines that the abnormality has occurred in the encoder.

10. The shift range control device according to claim 1, wherein
the abnormality determination unit is further configured to determine that the abnormality has occurred in the encoder when the number of times of learning the wall position is equal to or greater than a determination threshold value.

11. A shift range control device for switching a shift range by controlling driving of a motor in a shift range switching system that includes:
a motor;
an encoder configured to output an encoder signal that is a detection signal according to a rotation position of the motor; and
a shift range switching mechanism including a detent plate and a detent roller, the detent plate formed with a plurality of valley portions and a plurality of wall portions provided at both ends of the plurality of valley portions, and rotating integrally with an output shaft to which a rotation of the motor is transmitted, the detent roller capable of engaging with one of the plurality of valley portions according to the shift range, the shift range control device comprising a processor and a memory, the memory storing instructions configured to, when executed by the processor, cause the processor to:
calculate an encoder count value based on the encoder signal;
control energization to the motor;
learn a wall position that is the encoder count value when the detent roller abuts on one of the plurality of wall portions;
calculate an energization phase count value that is counted according to switching of the energization phase; and
determine an abnormality of the encoder based on the energization phase count value and the encoder count value before and after learning the wall position.

12. A shift range control device for switching a shift range by controlling driving of a motor in a shift range switching system that includes:
a motor;
an encoder configured to output an encoder signal that is a detection signal according to a rotation position of the motor; and
a shift range switching mechanism including a detent plate and a detent roller, the detent plate formed with a plurality of valley portions and a plurality of wall portions provided at both ends of the plurality of valley portions, and rotating integrally with an output shaft to which a rotation of the motor is transmitted, the detent roller capable of engaging with one of the plurality of valley portions according to the shift range, the shift range control device comprising:
an encoder count circuit configured to receive the encoder signal output from the encoder and calculate an encoder count value based on the encoder signal;
an energization control circuit configured to be connected with a motor driver that drives the motor and control energization to the motor;
a learning circuit connected with the encoder count circuit and configured to learn a wall position that is the encoder count value when the detent plate abuts on one of the plurality of wall portions;
an energization phase count circuit connected with the energization control circuit and configured to calculate an energization phase count value that is counted according to switching of the energization phase; and
an abnormality determination circuit connected with the energization phase count circuit and the encoder count circuit and configured to determine an abnormality of the encoder based on the energization phase count value and the encoder count value before and after learning the wall position.

* * * * *